(No Model.)
N. H. DIBBLE.
LUBRICATOR.
No. 246,602. Patented Sept. 6, 1881.
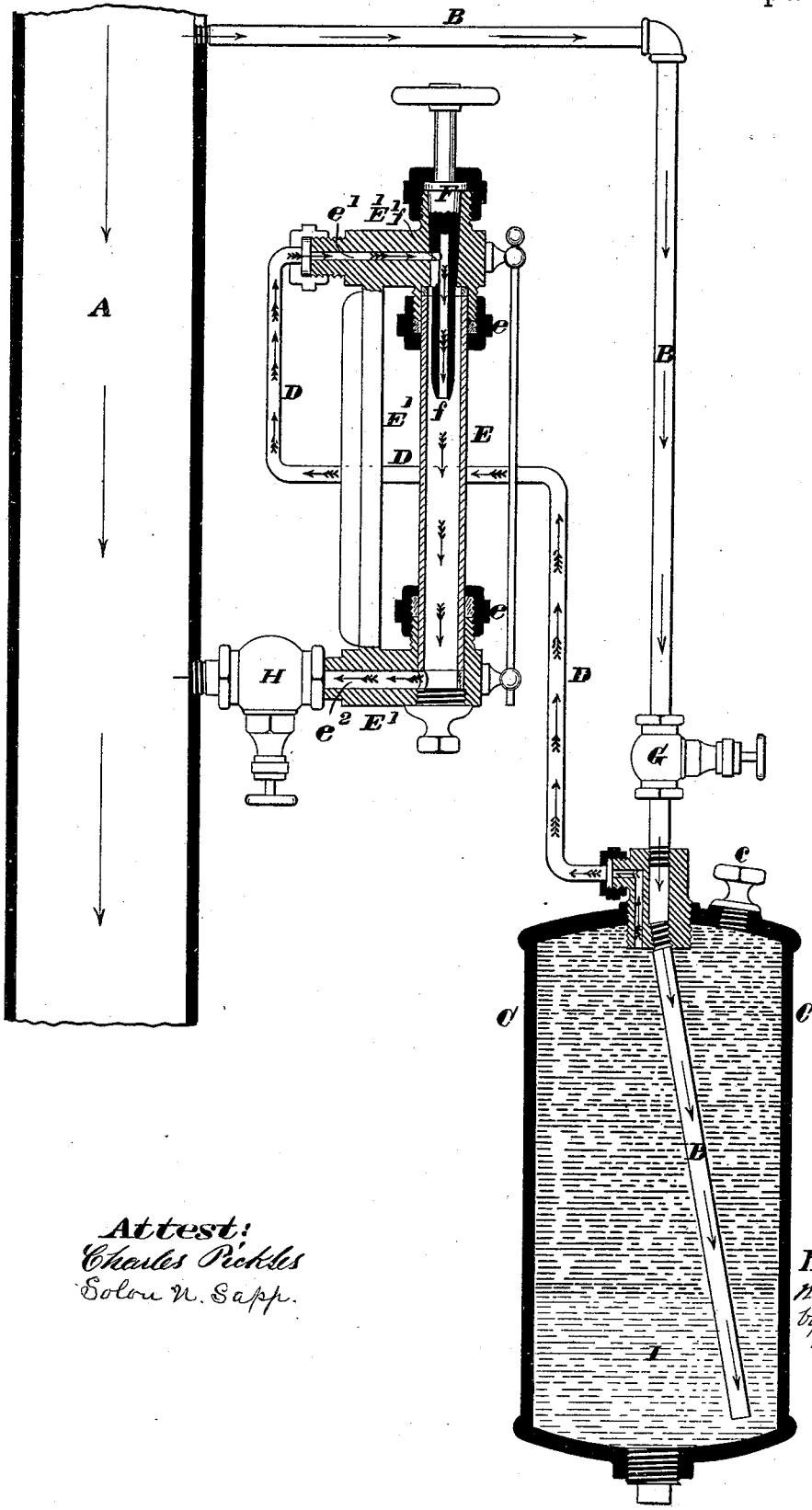
Attest:
Charles Pickles
Solon N. Sapp.
Inventor:
Noah H Dibble,
by C. D. Moody
atty.

UNITED STATES PATENT OFFICE.

NOAH H. DIBBLE, OF ST. LOUIS, MISSOURI.

LUBRICATOR.

SPECIFICATION forming part of Letters Patent No. 246,602, dated September 6, 1881.

Application filed May 7, 1881. (No model.)

*To all whom it may concern:*

Be it known that I, NOAH H. DIBBLE, of St. Louis, Missouri, have made a new and useful Improvement in Lubricators, of which the following is a full, clear, and exact description, reference being had to the annexed drawing, making part of this specification, in which the improvement is shown attached to a steam-pipe, the pipe and portions of the device being in section and the remaining portions in side elevation.

The present invention is an improvement in that class of steam-engine lubricators wherein the steam-pressure causes the lubricant to be fed automatically, and the movement of the lubricant can be readily observed and the supply easily and perfectly controlled.

In the drawing, A represents the steam-supply pipe of the engine to be lubricated. A pipe, B, leads from the pipe A to the lubricant-reservoir C, the pipe B being extended nearly to the bottom of the reservoir. The lubricant is supplied to the reservoir at $c$.

D represents a pipe leading from the reservoir C, from the upper part thereof, to what is termed the "indicator," or glass tube E. As thus far described the construction is mainly such as now in use. In place, however, of having the indicator-tube filled with water, and of delivering the lubricant into the tube at the lower end thereof, and allowing it to float upward through the water within the tube, the connection of the pipe D with the indicator-tube is at the upper end thereof, and no water is used within the tube, and the lubricant is allowed to fall downward through the empty tube. The latter is held in a suitable frame, E′, after the manner of the tube of a water-gage, the tube being packed at $e\ e$, and the frame being perforated at $e'$ to form an inlet to the tube, and at $e^2$ to form an outlet therefrom.

A plug, F, perforated longitudinally at $f$ and laterally at $f'$, is used to control the admission of the lubricant to the indicator. By turning the plug around the opening $f'$ can be brought opposite to or away from the passage $e'$, as desired. There are valves G and H, respectively, in the pipe B and between the indicator and the pipe A, to regulate the working of the device.

In practice, the reservoir C is filled with oil and the valves G and H and plug F are turned to open the various passages of the device. Steam flows through the pipe B to the reservoir C, condensing into water as it passes to and into the reservoir, and collecting as water, I, at the lower end of the reservoir. The oil is thereby forced through the pipe D to the indicator-tube, entering the latter at the upper end thereof, and falling from the lower end of the plug F downward through the tube E to the bottom thereof, whence it flows through the outlet $e^2$ into the pipe A, all as indicated by the arrows at various parts of the device.

An important advantage derived from the mode herein described of passing the lubricant through the indicator-tube is that it obviates the use of a fluid like water within the tube. In place of being required, as in other lubricators, to have a heavier fluid within the tube wherewith to effect the upward passage of the lubricant, the latter is enabled to fall by its gravity through the tube. The movement of the lubricant can also be more readily observed, as there is no fluid within the indicator to obscure the glass. The splashing of the lubricant as it drops to the bottom of the tube is an additional help in noting the movement of the lubricant. The plug F projecting into the tube E prevents the lubricant from touching the side of the glass.

I claim—

The combination of the pipe A, pipe B, reservoir C, pipe D, and the indicator-tube E, having the inlet thereto at the upper end and the outlet therefrom at the lower end, said pipe B extending nearly to the bottom of said reservoir, and said indicator-tube having the plug F perforated and projecting downward into the tube, substantially as and for the purpose described.

NOAH H. DIBBLE.

Witnesses:
CHAS. D. MOODY,
SOLON N. SAPP.